United States Patent [19]

Duke et al.

[11] 3,836,957

[45] Sept. 17, 1974

[54] DATA STORAGE SYSTEM WITH DEFERRED ERROR DETECTION

[75] Inventors: Keith A. Duke, Wappingers Falls; Benedicto U. Messina, Pougkeepsie, both of N.Y.

[73] Assignee: International Business Machines Corporation, Armonk, N.Y.

[22] Filed: June 26, 1973

[21] Appl. No.: 373,708

[52] U.S. Cl. ................ 340/146.1 AL, 235/153 AM

[51] Int. Cl. .......................... H04l 1/10, G06f 11/12

[58] Field of Search..... 235/153 AM; 340/146.1 AL

[56] References Cited

UNITED STATES PATENTS 3,697,949 10/1972 Carter et al. ............. 340/146.1 AL

*Primary Examiner*—Malcolm A. Morrison

*Assistant Examiner*—R. Stephen Dildine, Jr.

*Attorney, Agent, or Firm*—R. W. Berray

[57] ABSTRACT

Disclosed is a data transfer mechanism between the data bus of a data processing system and a data store. The data transfer mechanism includes common logic for converting between parity coded data on the data bus and error checking and correcting (ECC) coded data associated with the data store. Parity errors in data for presentation to the data store are detected, and single error correction and double error detection (SEC/DEC) syndrome bits are generated from the original ECC bits when data is to be read from the store and presented to the data bus. Additional circuitry is included to cause a signal indicating a single parity error on the data bus to modify the ECC bits generated for presentation to the data store with the data. On a subsequent read of the data from the data store, the modified ECC bits will produce a set of syndrome bits, specially recognized, to cause the data to be presented to the data bus with the original byte parity error recreated for subsequent detection.

7 Claims, 12 Drawing Figures

9-INPUT XOR TREE

PARITY ERROR DETECTOR

DATA STORAGE SYSTEM WITH DEFERRED ERROR DETECTION

BACKGROUND OF THE INVENTION

1. Field Of The Invention

This invention relates to data processing systems and more particularly to the handling of data error detection and correction between a data processing system data bus and a data store utilizing differing forms of error detection and correction.

2. Prior Art

The following patent, assigned to the assignee of this invention, is herewith incorporated by reference:

U.S. Pat. No. 3,648,239, Ser. No. 51,302 filed June 30, 1970, entitled "System For Translating To And From Single Error Correction-Double Error Detection Handling Code And Byte Parity Code," by William C. Carter et al.

This reference provides an excellent discussion of the differences between error detection of binary data by the use of parity bits, and the use of Hamming encoded data which provides error checking and correcting (ECC) bits to provide single error correction and double error detection (SEC/DEC) of binary data. Also described in this reference is the code utilized in the present invention as well as the manner of interconnecting various data bits to provide byte parity encoded data or ECC bits, and the manner of generating syndrome bits signifying errors from the storage device. Single errors signified by the syndrome bits can be corrected so that data can then be presented to the data bus in proper form. Multiple errors detected by syndrome bits are utilized to signal the data processing system.

It will be noted in the above cited reference that when data is to be stored in the data store, the byte parity encoded data is examined to determine whether or not the data to be stored contains any errors. If a parity error is detected, the data processing system is signalled to cause an interrupt to permit various corrective procedures or to, at least, provide an indication of the error. Regardless, further processing by the data processing system is halted.

As the size and complexity of data processing systems is increased, various techniques have been provided to accomplish multiprogramming or multiprocessing. That is, one or more independent users, or programs, may be sharing of the data processing system and transfer mechanism between the data processing system and the data store. Further, other systems provide high speed buffer mechanisms between the data store and the data processing system. These high speed buffer systems operate in such a way that data may be transferred from the high speed buffer to the data store at a time completely unrelated to the processing presently being accomplished within the data processing system. Another form of action taking place within a data processing system is that associated with the transfer of data from an input device to the data store, independent from the processing taking place in a central processing unit. That is, one sequence of program steps may call for an input operation which is initiated and permitted to be accomplished independent of further processing by the central processing unit.

In all of these above mentioned enhancements to data processing systems, it is conceivable that data which is transferred to the data store may never be utilized again. That is, the programs being executed may be called upon to generate certain intermediate data results on an assumption that they will be subsequently utilized, but discover after further processing that the intermediate data created is not needed further. It can thus be seen, that when a single parity error is permitted to interrupt the data processing system during a store operation, the overall efficiency of the data processing system is significantly reduced, and it is conceivable that the data which is in error may not be utilized.

Further undesirable situations which occur when single parity errors are detected during store operations relate to the fact that the data being transferred from the data bus to the data store may be completed unrelated to the program sequence presently being executed by a central processing unit of the data processing system. Therefore, when the parity error is detected and the processing system interrupted, any error logging or error handling program within the data processing system would have a difficult time determining which program was responsible for creating the erroneous data.

DESCRIPTION OF INVENTION

It is an object of this invention to provide a data transfer circuit between a data bus and data store wherein recognition of an error in data to be stored in the data store is deferred until the data is subsequently read from the data store for presentation back to the data bus.

It is another object of this invention to provide a data transfer circuit between a data bus and a data store utilizing different error detection coding schemes, wherein recognition of a single error in data transferred from the data bus to the data store is deferred until subsequent read out of the data from the data store to the data bus, which circuit utilizes byte parity coding for data on the data bus and Hamming ECC coding for data in the data store.

It is another object of this invention to provide a data transfer circuit between a data bus and a data store wherein the data on the data bus is provided with byte parity coding and the data in the data store is provided with ECC bits for single error correction and double error detection and wherein the ECC coding for the data to be stored is modified to provide subsequent recognition of a single parity error in the data for which the ECC bits were generated, which ECC coding is capable of recognizing an additional error situation in the data read from the data store.

These and other objects are achieved in a preferred embodiment of the present invention wherein, during the storing of data in the data store, a particular coding for ECC bits which provide SEC/DEC error detection and correction is provided. The ECC coding is such that any combination of single error or double error will never create a particular pattern of syndrome bits when the ECC coded data is subsequently read from the data store. During a store operation, after the ECC bits have been generated on the data received, the detection of a single parity error in the data for which the ECC bits have been coded will be effective to modify the generated ECC bit. The modification effected is such that when the data is subsequently read from the data store, the syndrome bits will be generated in the above mentioned particular pattern which is, in effect, an invalid syndrome pattern. Recognition of the particular syndrome pattern signifies the existence of the original single parity error.

The circuitry utilized to generate the ECC bits during a store operation and utilized for generating the byte parities during a read operation are shared and interconnected in such a fashion that the original byte parities are utilized in the process of coding the ECC bits. Further, during a read operation the ECC bits read from the data store are utilized in such a fashion that parity for various bytes of data are generated. During the read operation, the recognition of the particular invalid pattern of syndrome bits will be utilized to modify the parity bits generated, such that the original single byte parity error state of the data will be recreated before presentation back to the data processing system for recognition, at that time, of the attempt to use erroneous data.

in the absence of the original single byte parity error during a store operation, proper ECC bits will be generated for storage with the data. Subsequent reading of the data from the store will cause the ECC bits and the data read from the data store to be combined to produce patterns of syndrome bits signifying single or double error conditions in the data read from the data store. In accordance with the ECC coding, single error conditions can be corrected and the pattern of syndrome bits are decoded to cause correction of the data before presentation to the data bus. Further, the modified ECC bits created by the single parity error will still be effective during a read operation to provide detection of any additional data error which will be signified by a pattern of syndrome bits indicating a multiple error in the data. The multiple error signal can then be utilized to signal the data processing system of a need to interrupt processing.

DETAILED DESCRIPTION OF THE INVENTION

Figure 1:
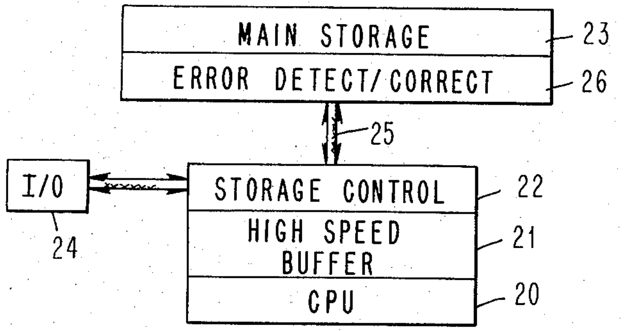
FIG. 1 is a block diagram of the data processing system incorporating the present invention.

The general environment of the present invention is shown in FIG. 1. Major portions of many data processing systems are depicted and include a central processing unit (CPU) 20 which responds to instructions and data for executing programs. As mentioned in the introduction, the present invention finds significant use in a data processing system which includes a high speed buffer 21 which retains most recently used data by the central processing unit 20. A storage control mechanism 22 controls the transfer of data between the high speed buffer 21 and a main data store 23. The storage control 22 also controls the transfer of data between the main storage 23 and I/O devices 24. Interconnecting the high speed buffer 21 and I/O devices 24, through the storage control unit 22 to the main storage 23, is a data bus 25. The data bus 25 may either be a single multiconductor bus between the storage control 22 and main storage 23 providing transfer in either direction, or two separate multiconductor buses, one used for transfer to main storage 23, and one from main storage 23. Either way, the data transferred to or from the main storage 23 will be passed through a data transfer circuit 26 providing error detection and correction in accordance with the preferred embodiment of the present invention.

The basic function of the error detect/correct data transfer circuit 26 is depicted in the above cited U.S. Pat. No. 3,648,239. Generally, it is effective to receive data on the bus 25 comprised of 64 binary bits of data and 8 parity bits. That is, the 64 data bits are comprised of eight, 8-bit bytes, with 1 parity bit associated with each byte reflecting the odd/even status of the number of binary 1 bits in the data byte. The data transfer circuit receives the data bits and the coded byte parities and determines the accuracy of the data which is to be stored in the main storage 23. The data transfer circuit 26, in accordance with the above cited patent, is also effective to utilize the 64 data bits and eight byte parity bits to generate Hamming coded ECC bits to provide single error correction and double error detection for the data to be stored in the main storage 23. Therefore, the 64 data bits and eight byte parity bits are converted to 64 data bits and 8 ECC bits for storage. During a read operation, that is transfer of data from the main storage 23 to the CPU 20, the previously generated ECC bits are utilized in combination with the 64 data bits to generate syndrome bits in accordance with the above cited patent to provide single error correction or double error detection. Further, in accordance with the above cited patent, the 64 data bits and 8 ECC bits are combined in such a way that byte parity coded data is produced for presentation to the bus 25.

Figures 2, 3:
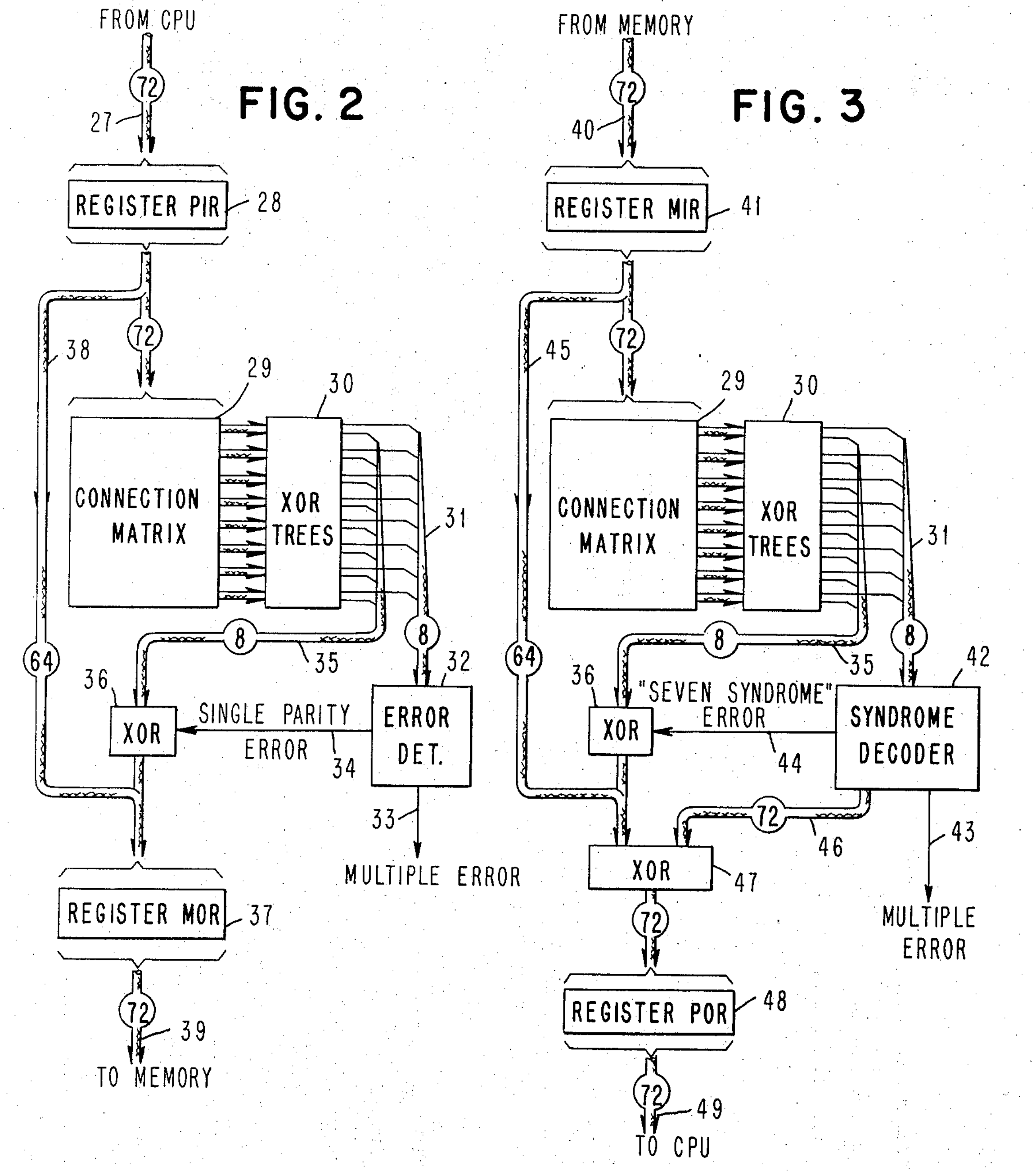
FIG. 2 is a block diagram showing the use of the invention when transferring data from a data bus to a data store.
FIG. 3 is a block diagram showing the use of the present invention when transferring data from a data store to a data bus.

FIGS. 2 and 3 show, respectively, the major functional units of the data transfer circuit used during a store operation and during a read operation. Both of these figures incorporate a major portion of the loic shown in the above cited U.S. Pat. No. 3,648,239.

In FIG. 2, data is to be transferred from a central processing unit to a data store. The data bus, previously referred to is shown as the cable 27 which presents 72 binary bits to a Processor Input Register (PIR) 28. The 72 binary bits received by register 28 are comprised of 64 bits of data (eight, 8-bit bytes) and 8 error detecting parity bits, 1 parity bit associated with each data byte. Data responsive means comprised of a connection matrix 29 and Exclusive OR trees 30 examine the data bits and parity bits in register 28 in accordance with a coding scheme to be more fully described in connection with FIG. 4 to generate ECC bits for inclusion with the 64 data bits in the data store, and for detecting parity errors. Any parity error detected by the data responsive means will be presented on a bus 31 to a first means which is an error detector 32. Error detector 32 will signal on a line 33 the existence of a plurality of parity errors to be utilized by the data processing system to immediately effect suspension of present processing to handle the error condition. The error detector 32 also provides a signal on a line 34 signifying a single parity error.

In the absence of any error conditions indicated by error detector 32, the generated ECC bits provided on a cable 35 will be passed through associated Exclusive OR circuits 36 to a Memory Output Register (MOR) 37 to be combined with the 64 data bits presented to register 37 on a cable 38. The 72 binary bits comprised of 64 data bits and 8 ECC bits are then transferred to the data store, or memory, on a cable 39.

The XOR box 36 is comprised of eight Exclusive OR circuits, one input of each being associated with a particular one of the 8 ECC bits on cable 35. The other input of all eight Exclusive OR circuits is connected to the line 34. The result of a signal on line 34 to the second input of all of the Exclusive OR circuits is to invert the binary state of the ECC bits presented to the Exclusuve OR circuits 36. That is, the normal function of an Exclusive OR circuit is to provide a binary 1 output only when a signal binary 1 input is presented. In other words, if a ECC bit is a binary 1 and a signal is produced on line 34, the output of the Exclusive OR circuit will be a binary 0. Alternatively, if the ECC bit presented to an Exclusive OR circuit is a binary 0, and a signal is produced on line 34, the output of the Exclusive OR circuit will be a binary 1. In the absence of a signal on line 34, all of the Exclusive OR circuits will provide an output which is identical to the input. The result of the operation of the Exclusive OR circuits 36 and the signal 34 from the error detector 32 is to modify the ECC bits generated by the data responsive means 29 and 30 by inverting their binary state. The reason for inverting all of the ECC bits in response to a single parity error signalled on line 34 will be made more clear in connection with a discussion of the ECC coding matrix shown in FIG. 4. At this point, the effect of modifying the ECC bits is to place them in a condition which, when combined with the original data bits on cable 38 is such that the error detection portion of the ECC bit function will produce syndrome bits in accordance with the above cited U.S. Pat. No. 3,648,239 which is an invalid combination of syndrome bits in accordance with the coding scheme utilized. The invalid pattern of syndrome bits, in particular, is any pattern comprised of 7 syndrome bits having a binary 1 condition.

Throughout the remainder of the drawings, structure previously recited, which is common to another figure, will be given the same numerical designation.

During a read operation as shown in FIG. 3, the binary data and previously generated ECC bits are applied to the connection matrix 29 and thus the Exclusive OR trees 30 on a cable 40, the output of the memory. The data is first entered in a Memory Input Register (MIR) 41. To be more fully explained, the connection matrix 29 and Exclusive OR trees 30 examine the binary data received from memory, along with the ECC bits, to generate, on cable 31, syndrome bits, and on cable 35, the byte parity bits which are to be transferred onto the data bus for presentation to the data processing system.

If the operation of storing the binary data and subsequent read out of the binary data has been without error, the syndrome bits presented on cable 31 will all be binary 0. This fact, or the existence of any error conditions, are recognized by a syndrome decoder 42. If error conditions have occurred, the syndrome decoder 42 will be effective to indicate the existence of multiple errors on a line 43 which is presented to the data processing system for immediate interruption of processing.

If, during the functioning of a store operation shown in FIG. 2, the single parity error condition was signalled on line 34, the subsequent reading of the data from memory, with the modified ECC bits, will provide a pattern of syndrome bits on cable 31 presented tothe syndrome decoder 42 which is decoded and signalled on line 44 as a "Seven Syndrome Error" situation. The effect of the signal on line 44 at the Exclusive OR circuits 36 is to invert all of the generated byte parity bits on cable 35 for combination with the binary data bits on a cable 45.

A cable 46 is shown connected from the syndrome decoder 42 to Exclusive OR circuits 47. If a single error is detected during a read operation, a syndrome bit pattern on cable 31 is generated which identifies an erroneous data bit or erroneous ECC bit. The decoding of the syndrome bits by the syndrome decoder 42 is effected to energize a single line of the cable 46 for presentation to the Exclusive OR circuits 47. The single line being energized from the cable 46 associated with erroneous binary bits will be effective at the Exclusive OR circuit 47 to invert the erroneous data bit on bus 45 or generated parity bit on cable 35. Therefore, the output of Exclusive OR circuits 47 will be corrected and presented to a Processor Output Register (POR) 48 for presentation to the data processing system on the bus 49.

If the previously mentioned signal on line 44 indicating a 7 syndrome error had occurred, the operation of Exclusive OR circuit 36 will be effective to recreate the erroneous byte parity for combination with the data on cable 45, through Exclusive OR circuits 47, to the data bus 49. When this data is received by the data processing system from the bus 49, the parity checking circuits of the data processing system will recognize the parity error and cause corrective action to be taken. Since the parity error is now recognized as a result of an attempt to operate on the data by a particular program, the particular program which created the error is easily determined.

Figure 4:
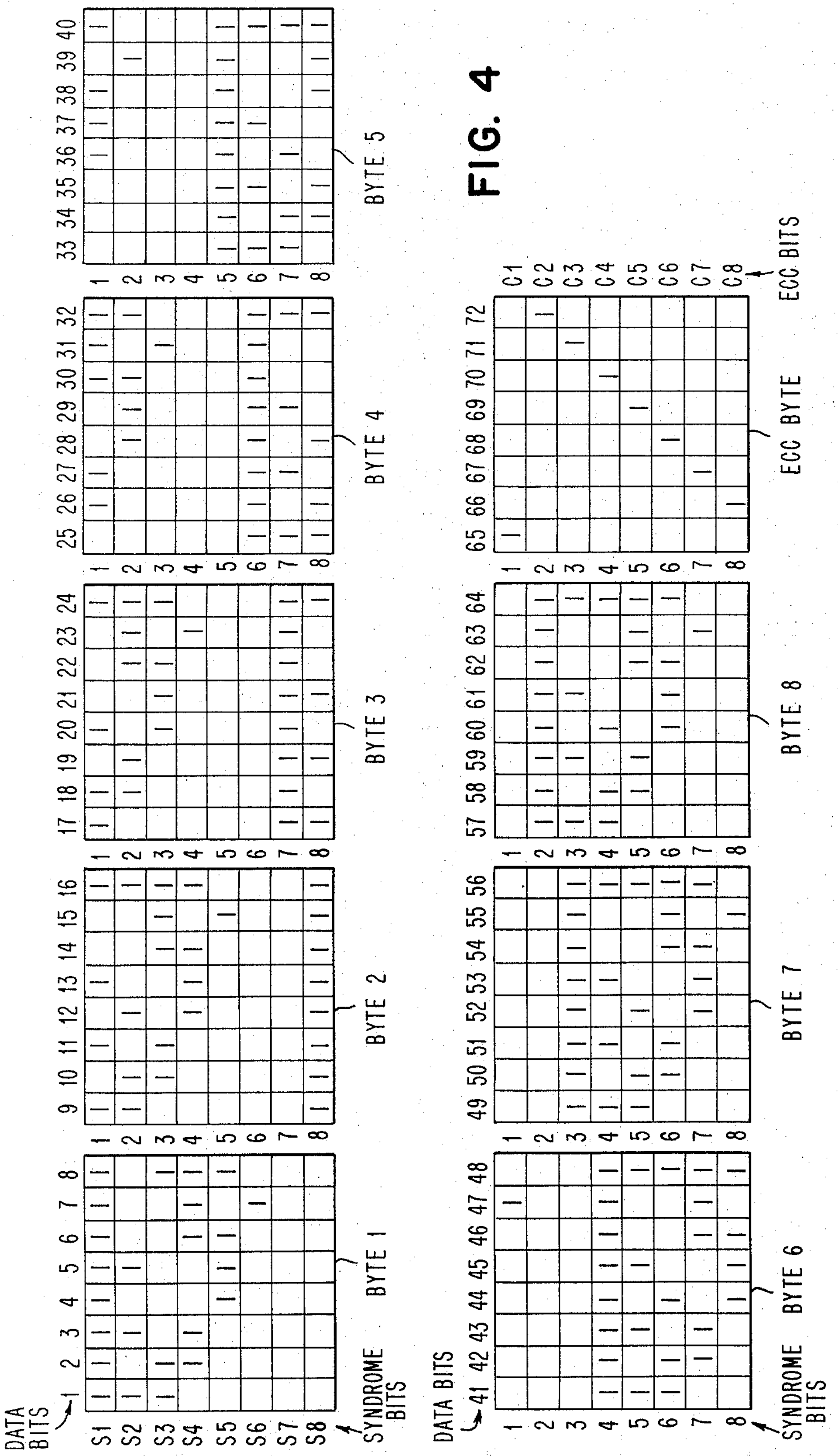
FIG. 4 shows the coding utilized to generate ECC bits during a store operation and syndrome bits during a read operation.
Figure 5:
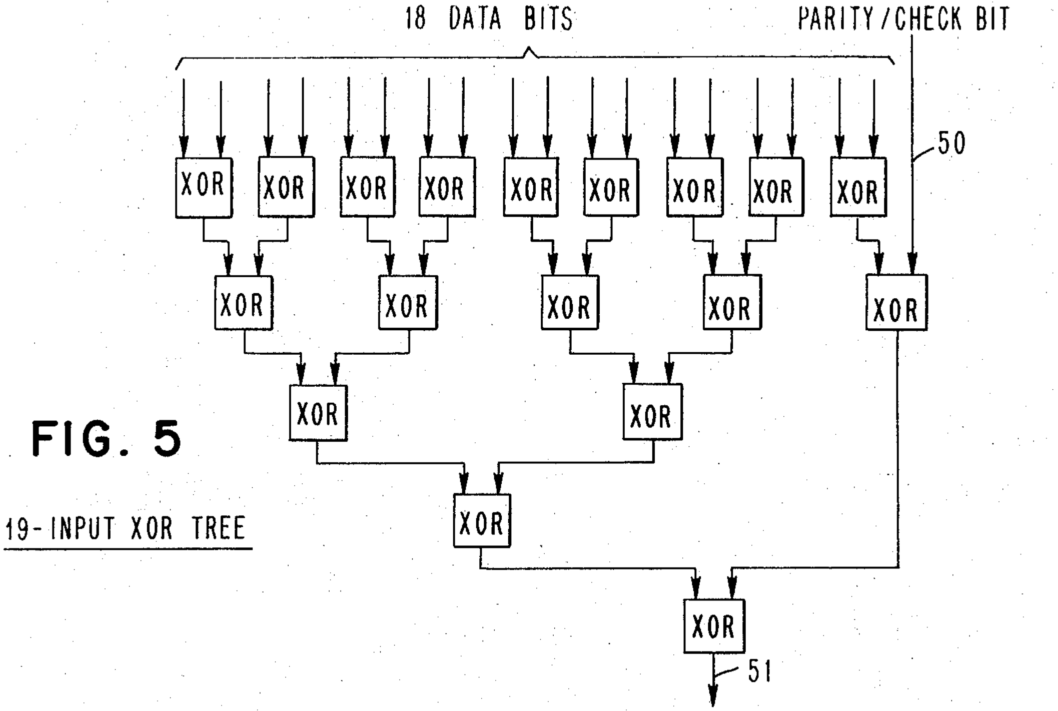
FIG. 5 shows an Exclusive OR tree for determining the odd/even status of binary 1's for 19 input bits.

FIG. 4 is the maxtrix taken from the above cited U.S. Pat. No. 3,648,239 showing the manner in which ECC bits or syndrome bits are generated in accordance with the teachings of the above cited patent. The basic philosophy of the matrix which permits use of common hardware for the generation of ECC bits and generation of byte parity bits, is directed to the fact that all of the data bits of a particular byte of data enter into the generation of an associated, unique ECC bit or syndrome bit. For example, all of the data bits of byte 1 are utilized in the generation of syndrome bit S1 or ECC bit C1. Likewise, for example, all of the data bits of byte 3 are utilized for the generation of syncrome bit S7 or ECC bit C7. Therefore, when ECC bits are being generated, a particular ECC bit can be generated by examining only the byte parity of the particular byte for which all data bits are to be examined along with individual partricular data bits from all other bytes as determined by the connection matrix 29 shown in FIGS. 2 and 3.

It is the function of the Exclusive OR trees 30 of FIGS. 2 and 3 to generate a proper ECC bit during the store operation and the proper byte parity bits during a read operation. For example, the ECC bit C8 will be generated utilizing only the byte parity of data byte 2 in combination with byte 3 data bits 17, 19, 21, and 24, and byte 4 data bits 25, 26, 28, and 32, etc. At the same time ECC bits are being generated, another set of Exclusive OR circuits will be providing a byte parity check for byte 2 by utilizing the 8 data bits of byte 2 and its associated parity bit. The byte parity for byte 2, to be presented to the data processing system on the data bus, can be generated by examining check bit C8 and all data bits associated with ECC bit C8 other than the data bits of byte 2. Further, during a read operation, the combination of 18 data bits and check bit C8 is then combined with the data bits of byte 2 read from memory to determine whether or not a syndrome bit should be generated signifying an error situation.

Figure 6:
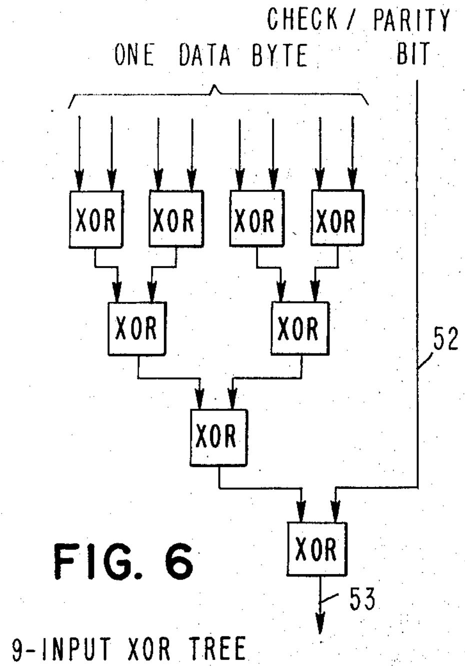
FIG. 6 shows the logic of an Exclusive OR tree for determining the odd/even status of binary 1's for nine input bits.

FIGS. 5, 6, 7 and 8 depict in detail and block form the Exclusive OR trees 30 shown in FIGS. 2 and 3. A first Exclusive OR tree shown in FIG. 5 receives 18 data bits in accordance with the matrix of FIG. 4 and an additional bit on line 50 which will either be a parity bit or check bit. The 19 input Exclusive OR tree is operating during a store or read operation. The output 51 of the Exclusive OR tree will be a binary 0 or a binary 1 depending on whether or not the inputs to the Exclusive OR tree have an odd or even number of binary 1's. FIG. 6 depicts a nine input Exclusive OR tree which receives the 8 data bits of a particular data byte along with a signal on line 52 which will either be a check bit or parity bit depending on whether it is a read or store operation taking place. Again, an output 53 will be generated in accordance with the odd/even number of binary 1's in the input data.

Figure 7:
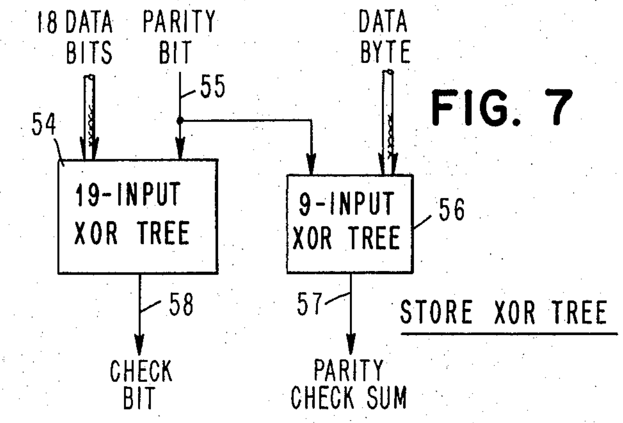
FIG. 7 is a block diagram showing the interconnection of the Exclusive OR trees of FIG. 5 and FIG. 6 during a data store operation.

In FIG. 7, a store operation is depicted for the generation of a particular ECC check bit and detection of a parity error in a particular data byte received from the data processing system on the data bus. The 19 input Exclusive OR tree 54 receives as inputs, the parity bit on line 55 of the data byte in which all 8 data bits of the byte enter into the generation of the check bit and the remaining 18 data bits in accordance with the matrix of FIG. 4. The nine input Exclusive OR tree 56 receives as its inputs the 8 data bits of the data byte used in generating the associated check bit on line 58, and the parity bit on line 55 to provide a signal on line 57 indicating the existence of a parity error in that particular data byte. In connection with FIG. 2, the signal on line 57 is one line of the cable 31 entering the error detector 32. The check bit signal on line 58 is a single line of cable 35 which is combined with the data on cable 38 to provide an input to the memory comprised of the 64 data bits and the ECC byte made up of 8 ECC bits.

Figure 8:
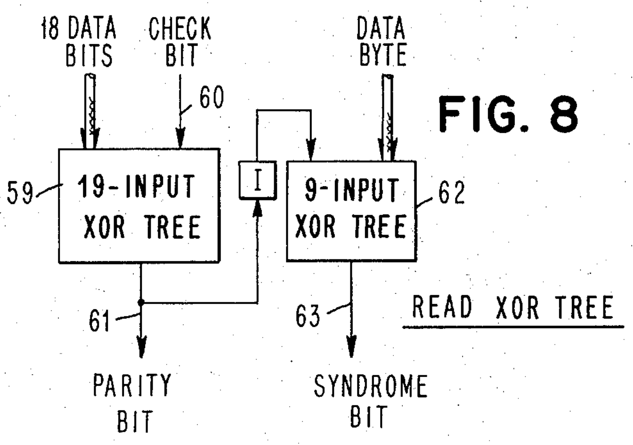
FIG. 8 is a block diagram showing the interconnection of the Exclusive OR tree shown in FIG. 5 and FIG. 6 during a read operation.

FIG. 8 depicts the operation of the Exclusive OR trees during a read operation. The 19 input Exclusive OR tree 59 receives 18 data bits in accordance with the connection matrix 29 shown in FIG. 3 and the associated check bit on a line 60. The output of the Exclusive OR tree 59 should be the proper parity bit for the 8 binary bits of the data byte associated with the check bit on line 60. The output 61 is one line of the cable 35 in FIG. 3 representing the parity bit of the particular data byte. The nine input Exclusive OR tree 62 receives the 8 bits of the data byte associated with the check bit on a line 60, and utilizes the generated parity bit on line 61, after inversion, to detect an error condition in the data read from the memory to provide a signal on line 63 which is a syndrome bit signifying the error situation. In the absence of any error conditions during a store operation or a subsequent read operation, the output 63 representing a syndrome bit should be a binary 0.

Figure 9:
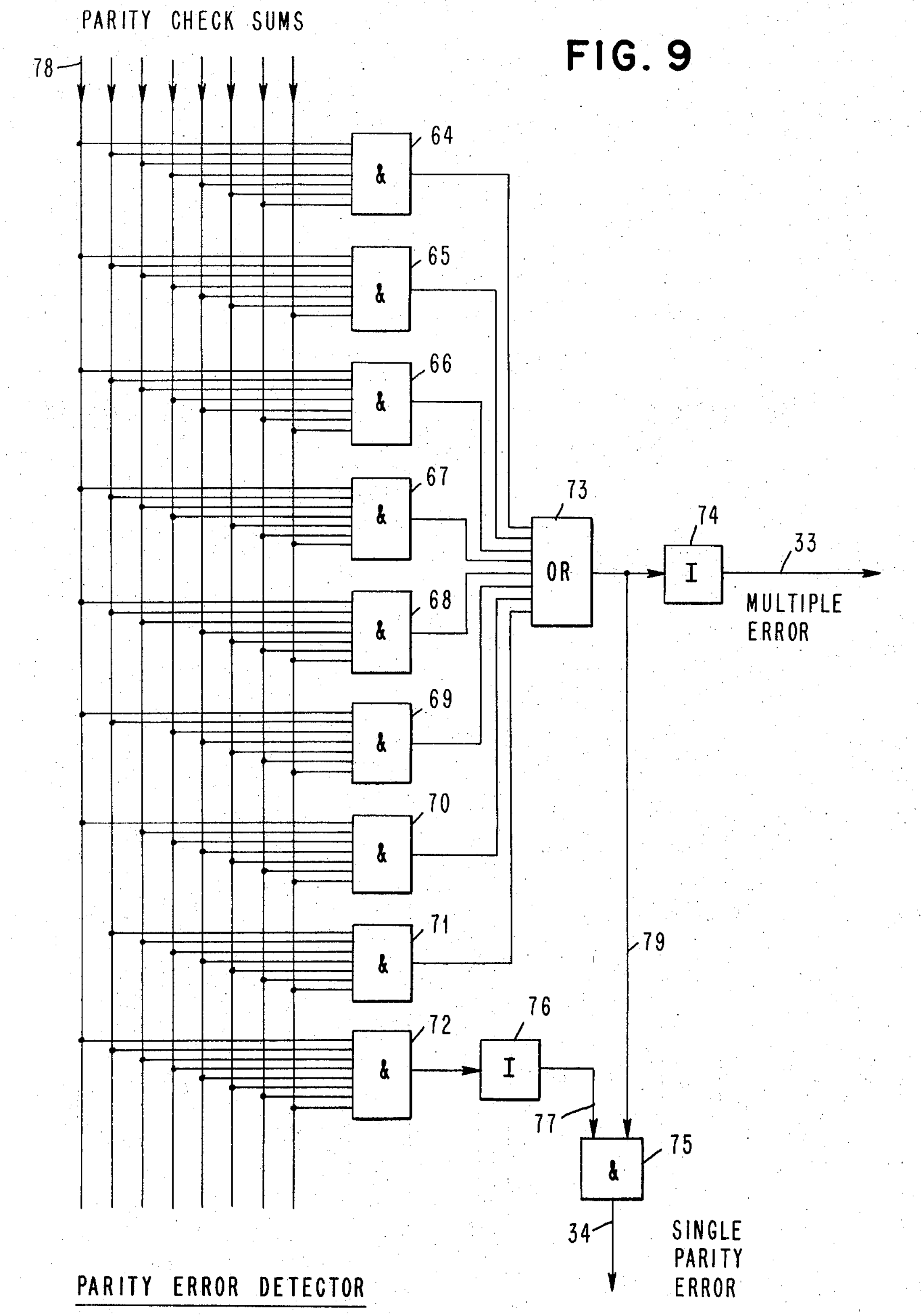
FIG. 9 shows the logic required for detecting multiple or single byte parity errors on data to be transferred from a data bus to a data store.

Details of the error detector 32 of FIG. 2 are shown in FIG. 9. The parity checks generated on line 57 of FIG. 7 for all of the eight data bytes are received as inputs at a series of AND circuits 64 through 72. Positive logic is used throughout the details shown in the drawings. That is, a binary 1 is represented by a positive value. An AND circuit such as 64 will produce a binary 1 output if all of the inputs are a binary 1. In accordance with the logic of the nine input Exclusive OR tree 56 of FIG. 7, if no errors are present in the data bits received, all of the parity check sums on signal lines shown in FIG. 9 will be a binary 1. The outputs of AND circuits 64 – 71 are applied to an OR circuit 73, the output of which is applied to an inverter 74 and a further AND circuit 75. An inverter 76 receives as its input the output of AND circuit 72. By utilizing the positive logic described above, it will be noted that if there are no parity errors, AND circuit 72 will receive postive inputs on all of its inputs and provide a binary 1 output, inverted by inverter 76 to disable AND circuit 75. Further, all of the AND circuits 64 – 71 will receive binary 1's on all of their inputs providing an output from OR circuit 73, inverted by inverter 74, providing a binary 0 on line 33.

If a single parity error should occur, AND circuit 72 will not receive a binary 1 on all inputs and produce a binary 0 output, inverted to a binary 1 by inverter 76 to provide a binary 1 input on line 77 at AND circuit 75. Further, with a single parity check error, one of the signal lines representing the parity check sum of the data byte in error will be a binary 0. If for example, there is a binary 0 on line 78 but a binary 1 on all remaining lines, AND circuit 71 will provide a binary 1 output. This will be effective to provide a binary 1 output from OR circuit 73 to produce a binary 1 input on line 79 to AND circuit 75, and thus provide an output signal on line 34 indicating a signale parity error.

If there are two or more parity errors, at least two of the inputs to the AND circuits 64 – 71 will be a binary 0 and therefore none of the AND circuits 64 – 71 can possibly receive a binary 1 on all of its inputs. Thus a binary 0 output will be produced from OR circuit 73 which is inverted by inverter 74 to provide a signal on line 33 representing a multiple error.

In accordance with the present invention, it is the function of the binary 1 signal on line 34 of FIG. 9, signifying a single parity error, to provide modification to the ECC bits generated during the store operation depicted in FIG. 2. The modification to the ECC bits on cable 35 at Exclusive OR circuits 36 is for the purpose of creating a pattern of ECC bits, for storage with the data, which can be subsequently detected during a read operation for the purpose of recreating the single parity error situation.

By examining FIG. 4, the modification of the ECC bits whichis to take place can be reasoned. From examination of the matrix of FIG. 4, it can be seen that any particular data bit utilized for generating ECC bits does not affect more than five of the ECC bits generated. For example, data bit 16 is utilized in generating ECC bits C1, C2, C3, C4 and C8. Therefore, when the data bits are read from memory along with the previously generated ECC bits, if data bit 16 were a single bit in error, the combination of the remaining data bits, and the previously generated ECC bits, will provide syndrome bits in which syndrome bits S1, S2, S3, S4, and S8 will be in a binary 1 condition. By decoding the binary 1 state of the syndrome bits, the identity of the data bit in error can be determined and its binary condition inverted to provide correct data.

A further examination of the matrix of FIG. 4 will show that if 2 data bits are in error on a subsequent read of the data, the combination of data bits and previously generated ECC bits will provide an even number of binary 1 syndrome bits. That is, there will either be 2, 4, 6 or 8 syndrome bits in the binary 1 state. Therefore, in normal error situations, the pattern of syndrome bits generated will either be odd or even indicating a single or double error situation. One combination of syndrome bits that will never be generated, whether a single or double error situation occurs in the number seven. That is, it will require at least three errors to generate a pattern of syndrome bits having seven binary 1's being generated.

By utilizing the signal on line 34 at the Exclusive OR circuits 36, as shown in FIG. 2, as one input to all of the Exclusive OR circuits in combination with the previously generated ECC bits on cable 35, the effect is to invert all of the ECC bits to be included with the data bits on cable 38 in register 37 for presentation to the memory on cable 39. On subsequent read out, in accordance with the logic shown in FIG. 3, the combination of data bits and previously modified ECC bits in the Exclusive OR trees 30, will cause seven of the syndrome bits on cable 31 to be a binary 1 for presentation to the syndrome decoder 42. This will be detected as a "Seven Syndrome Error" and signalled on line 44. The use of the signal on line 44 will be discussed in detail subsequently. The effect is to invert all of the parity bits generated on the cable 35 at the Exclusive OR circuits 36 to thus recreate the original parity error. It should be noted at this time, that the effect of inverting all of the generated ECC bits when a signal parity error is detected during a store operation, does not effect the ability of the ECC bits to detect the existence of an additional error situation during the subsequent read operation. That is, the original data to be stored was detected to have had a single parity error, but if on a subsequent read operation an additional data bit should be in error, the syndrome bits generated will have an even number and thus provide indication of a multiple error on the line 43 of FIG. 3.

Figure 10A:
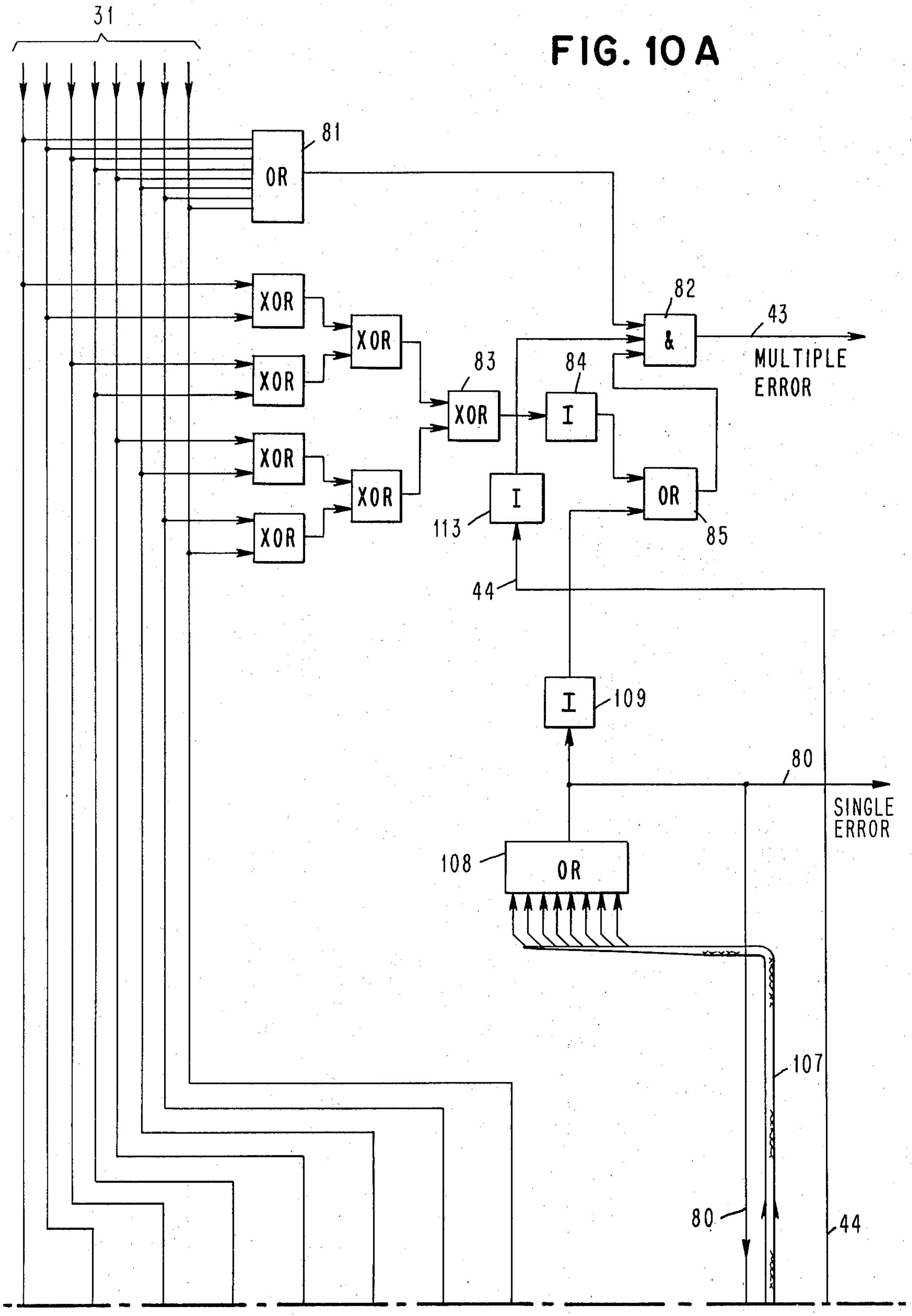
FIGS. 10A–10C show the logic which responds to data and ECC bits from a data store for generating syndrome bits signifying error conditions.
Figure 10B:
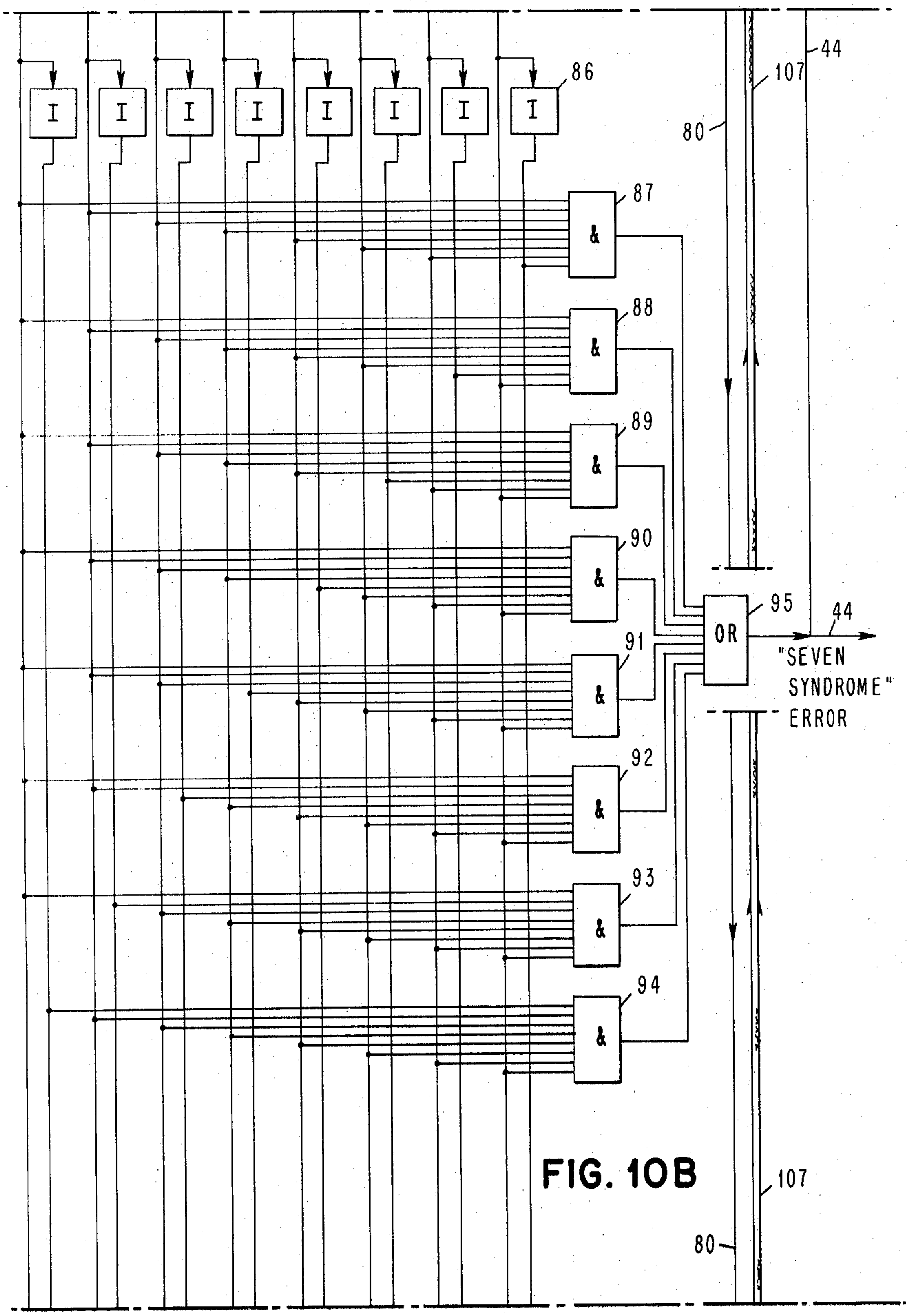
Figure 10C:
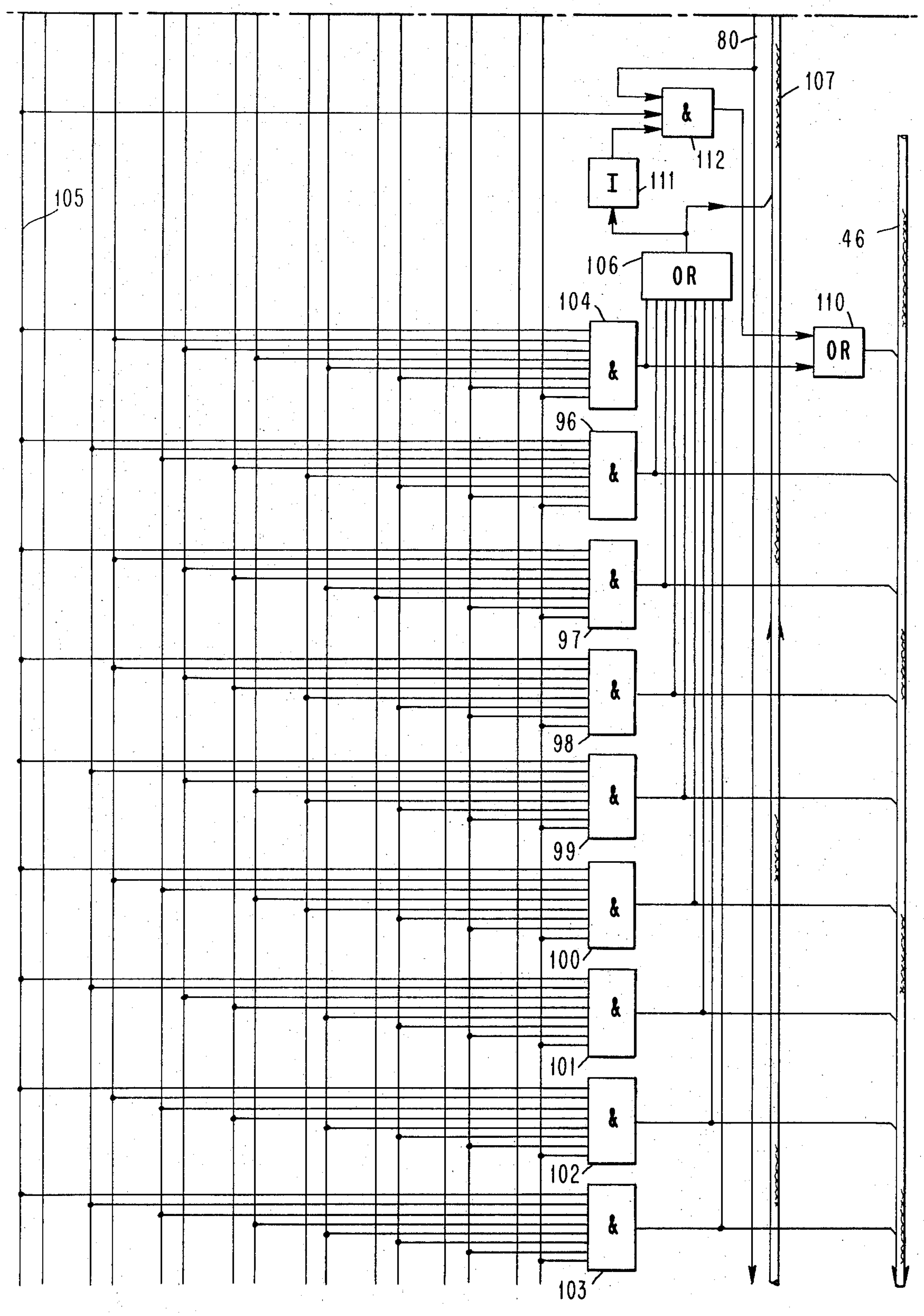

Details of the syndrome decoder 43 of FIG. 3 are shown in connection with FIG. 10. FIGS. 10A, 10B, and 10C when arranged vertically show the major portions of the syndrome decoder. FIG. 10C represents the logic associated with one particular eight-bit byte and will be duplicated for each of the remaining bytes of the data. In particular, FIG. 10C shows the functioning of the correcting capability of the ECC coding.

In FIG. 10A, the binary 1 state of syndrome bits on cable 31 of FIG. 3 are received and applied to logic for the purpose of signifying a multiple error condition on the signal line 43 and for generating a single error signal on a line 80 effective to cause the data to be corrected when this is possible. An OR circuit 81 will provide a binary 1 output if at least one of the syndrome bits is a binary 1 and this output is applied to an AND circuit 82. The output of an Exclusive OR circuit 83, which is applied to an inverter 84, determines the odd or even number of binary 1 syndrome bits and thus the existence of single or multiple errors. The output of an OR circuit 85 provides a second input to AND circuit 82 for indicating a multiple error condition. That is, if at least 1 syndrome bit is a binary 1, OR circuit 81 provides one input to AND circuit 82. If an even number of binary 1's are present in the syndrome bits, Exclusive OR circuit 83 will not produce an output and therefore inverter 84 will provide a binary 1 signal through OR circuit 85 to the other input of AND circuit 82 to signify the multiple error condition on line 43.

In FIG. 10B, each of the syndrome bits on cable 31 is applied to an inverter which thereby provides complementary signals for the remainder of FIG. 10. That is, if a syndrome bit is a binary 1 and is applied to, for example, inverter 86, the output of the inverter 86 will appear as a binary 0. Alternatively, if the syndrome bit applied to inverter 86 is a binary 0 the output of inverter 86 will appear as a positive binary 1. In FIG. 10B, the series of AND circuits 87 through 94, which provide their outputs to an OR circuit 95, produce the signal "Seven Syndrome Error" on line 44 corresponding to line 44 in FIG. 3. The effect on the signal on line 44, as shown in FIG. 3, is to invert all of the generated byte parity bits on cable 35 at the Exclusive OR circuits 36 to thereby recreate the original signal byte parity error. It was the same single byte parity error that created the pattern of ECC bits which ultimately produced the 7 syncrome bits. It is also used to inhibit the multiple error signal 43 at AND circuit 82 through an inverter 113. Only when there are exactly 7 syndrome bits will any of the AND circuits 87 through 94 provide an output to OR circuit 95. For example, AND circuit 87 will produce a binary 1 output only when the syndrome bits associated with inverter 86 is a binary 0 and all other syndrome bits are binary 1.

FIG. 10C shows the logic which responds to syndrome bits on cable 31 for a particular one of the data bytes. In the normal functioning of ECC coded data, AND circuits 96 through 103 decode the pattern of binary 1 syndrome bits in those cases where a single bit data error is to be corrected in this particular data byte. Depending on the pattern of binary 1's of the syndrome bits, one of the AND circuits 96 – 103 will be enabled to provide a binary 1 output on the cable 46 to the data bit identified by the pattern of syndrome bits. The bit position identified will be inverted in the Exclusive OR circuits 47 of FIG. 3.

When only a single syndrome bit is in the binary 1 state, an AND circuit such as the one shown at 104 detects this fact. That is, in connection with the showing of FIG. 10C, if the leftmost syndrome bit shown on the line 105 is the only syndrome bit in the binary 1 state, and all remaining syndrome bits are a binary 0, AND circuit 104 provides an indication that it was the ECC bit associated with the byte of FIG. 10C which was in error.

OR circuit 106 provides a binary 1 output on a cable 107 whenever one of the AND circuits 104, or 96 – 103, provides an output. The signal from the output of OR circuit 106 supplied to cable 107, along with comperable circuitry for all remaining data bytes, is applied to an OR circuit 108 in FIG. 10A. The output of OR circuit 108 signals the existence of a single error in the normal course of the error detection and correction capability of the ECC bits. The output of OR circuit 108 is inverted at inverter 109 for application through OR circuit 85 as a binary 0 input to AND circuit 82 to negate the output of a multiple error signal.

The operation of the remaining logic of FIG. 10C, namely, OR circuit 110, inverter 111, and AND circuit 112 is utilized to signal those situations where the generated byte parity bit, for the particular byte associated with the logic of FIG. 10C, should be inverted. The output of OR circuit 110 will be a binary 1 for application to the cable 46 of FIG. 3 to the parity bit associated with the byte, for application to EXclusive OR circuits 47, to cause the inverting of the particular parity bit involved.

The reason for creating a binary 1 output from OR circuit 110 becomes evident on examination of FIG. 8. AND circuit 104 will provide a binary 1input to OR circuit 110 whenever the check bit associated with this byte, such as on line 60 of FIG. 8, is in error. In this situation, the generated parity bit on line 61 would be in error and the syndrome bit on line 63 would be a binary 1 and applied to line 105 in FIG. 10C. In this situation, the generated parity bit for the byte depicted in FIG. 10C must be inverted to make it reflect the correct parity of the data byte provided at the input of the nine input Exclusive OR tree 62 of FIG. 8. The other input to OR circuit 110 is from AND circuit 112. AND circuit 112 will provide a binary 1 input to OR circuit 110 indicating the parity bit associated with this byte should be inverted to reflect the fact that one of the 18 data bits applied to the 19 input Exclusive OR tree 59 of FIG. 8 is in error and being corrected by logic associated with another byte of data. That is, the syndrome bit 105 for this byte has been set in accordance with the matrix of FIG. 4, a single error has been signalled and is thus being corrected as indicated on line 80, and none of the AND circuits 96 – 103 or AND circuit 104 is providing an output as indicated by a positive binary 1 output by inverter 111. AND circuit 112 therefore indicates that because of an error in one of the data bits of another byte, the generated parity bit in line 61 of FIG. 8 associated with this particular data byte is in error and must therefore be inverted.

There has thus been shown logic for translation between ECC encoded data and byteparity data where the ECC code matrix permits recognition of a single byte parity error during the generation of ECC bits, such that the ECC bit pattern may be modified to reflect the single byte parity error, but eliminate the need for recognizing the byte parity error during a store operation. Subsequent reading of the data and modified ECC bits from the store provide deferred recognition of the single byte parity error, but also preserves the ability to detect additional errors creating multiple errors, and retains the original purpose of the ECC coding for the purpose of normal single error correction or double error detection concerning operation of the storage system.

What is claimed is:

1. A data transfer circuit between a data bus and data store for receiving error checking and correcting (ECC) coded data from the data store during a read operation for generating byte parity coded data for presentation to the data bus, and receiving byte parity coded data from the data bus during a store operation, for generating ECC Coded data for presentation to the data store, including data responsive means, during a store operation for generating ECC bits for presentation to the data store with the data bits and generating byte parity error signals from the data bus, and during a read operation for generating byte parity bits for presentation to the data bus with the data bits and generating syndrome bit signals indicating error conditions from the data store, said data transfer circuit further comprising:

first means, connected to the data responsive means, for generating, during a store operation, a first signal indicating an error condition in the data received from the data bus; and second means, connected to said first signal generating means, for modifying the ECC bits generated by the data responsive means for inclusion with the data bits to be stored.

2. A data transfer circuit in accordance with claim 1 wherein:

said first signal generating means indicates a single byte parity error.

3. A data transfer circuit in accordance with claim 2 wherein said second means includes:

means for forcing the generated ECC bits to an invalid combination.

4. A data transfer circuit in accordance with claim 3 wherein:

the ECC code utilized s such that any single or double bit error in the ECC coded data cannot produce a particular pattern of syndrome bit signals; and said forcing means includes means for modifying the generated ECC bits to create the particular pattern of syndrome bit signals.

5. A data transfer circuit in accordance with claim 4 wherein said forcing means includes:

Exclusive OR circuits, one associated with each of the ECC bits generated, one input of each said Exclusive OR circuits being connected to the data responsive means to receive the associated ECC bit and a second input of all said Exclusive OR circuits being connected to said first signal generating means.

6. A data transfer circuit in accordance with claim 4 further comprising:

third means, connected to the data responsive means, for generating, during a read operation, a second signal indicating detection of the particular pattern of syndrome bit signals; and fourth means, connected to said second signal generating means, for modifying the byte parity bits generated by the data responsive means for inclusion with the data bits.

7. A data transfer circuit in accordance with claim 6 wherein said fourth means includes:

means for inverting all of the generated byte parity bits, whereby the original byte parity error detected during the store operation is recreated.

* * * * *